United States Patent [19]

Bird

[11] Patent Number: 5,386,543

[45] Date of Patent: Jan. 31, 1995

[54] MATRIX DISPLAY DEVICE WITH LIGHT SENSING FUNCTION AND TIME-SHARED AMPLIFIER

[75] Inventor: Neil C. Bird, Horley, England

[73] Assignee: U.S. Philips Corporation, New York, N.Y.

[21] Appl. No.: 96,632

[22] Filed: Jul. 21, 1993

[30] Foreign Application Priority Data

Sep. 7, 1992 [GB] United Kingdom ............... 9220104

[51] Int. Cl.$^6$ .................... G06F 3/033; G09G 3/36
[52] U.S. Cl. ........................ 395/500; 364/DIG. 2; 364/927; 364/927.1; 364/927.2; 364/927.5; 364/927.6
[58] Field of Search ............... 395/DIG. 1 MS File, 395/DIG. 2 MS File, 200, 250, 275, 100, 500, 800; 345/10, 14, 20, 21, 22, 23, 24, 44, 45, 46, 47, 48, 49, 50, 51, 52, 55, 59, 60, 92, 84, 86, 87, 88, 89, 90, 98, 104, 166, 156, 175, 180, 181, 182, 183

[56] References Cited

U.S. PATENT DOCUMENTS 4,345,248 8/1982 Togashi et al. .................... 340/784

FOREIGN PATENT DOCUMENTS 0491436 6/1992 European Pat. Off. .

Primary Examiner—Robert B. Harrell
Attorney, Agent, or Firm—John C. Fox

[57] ABSTRACT

A combined matrix display and light sensing device comprising arrays of display elements (12) and light sensing elements (18) connected to a first set of address conductors (14) to which scan signals (15) are applied, a second set of address conductors (16) through which data signals from a drive circuit (30) are supplied to the display elements (12) and to which a detection circuit (40) is connected to detect illumination of sensing elements. The detection circuit comprises charge sensitive amplifier circuits (45) which serve also as buffer amplifiers for data signals from the drive circuit (30). Each circuit (45) comprises an output, a first input connected to a conductor of the second set, a second input, and a switch (48) and capacitor (47) connected in parallel between the output and the first input. A control circuit (19) periodically opens and closes the switch and is arranged to apply to the second input data signals for display elements when the switch is closed and a read potential for reading the condition of sensing elements when the switch is open.

3 Claims, 2 Drawing Sheets

MATRIX DISPLAY DEVICE WITH LIGHT SENSING FUNCTION AND TIME-SHARED AMPLIFIER

BACKGROUND OF THE INVENTION

This invention relates to a matrix display device for displaying information which includes optical sensing means enabling input of information as well, for example by way or a light pen. More particularly, the invention relates to a combined matrix display and light sensing device comprising an array of display elements, an array of light sensing elements which are responsive to illumination so as to provide an electrical charge indicative thereof, first and second sets of address conductors connected with the arrays of display and light sensing elements, the display elements and the light sensing elements each being connected with an address conductor of each set, a first drive circuit connected to the first set of address conductors for scanning the arrays, a second drive circuit for providing data signals which are supplied to the display elements via address conductors of the second set, a detection circuit for sensing the charge provided by the sensing elements and providing an output in accordance therewith and comprising charge sensitive amplifier circuits each having an output, a first input connected to an address conductor of the second set, a second input for receiving a read potential and a capacitor and switch connected in parallel between the output and the first input, and control means for opening and closing the switch of each charge sensitive amplifier circuit periodically and providing a read potential to the second input.

This kind of device may be used for example as an output/input interface for a computer system through which information can be displayed to a user and information can be entered by a user by writing with a light pen.

An example of such a device is described in EP-A-0491436. This device comprises a row and column array of liquid crystal display elements, each of which includes a switching element in the form of a thin film transistor (TFT), combined with a row and column array of light sensing elements which each comprise a photo-sensitive element, for example a photo-diode or photo-resistor, connected to a capacitor and a switching element, also comprising a TFT. The TFTs of the display elements and the sensing elements are connected to row and column address conductors. The display elements are driven in conventional fashion by a scan drive circuit which applies a selection signal to each row conductor in turn, and a data signal drive circuit which applies display data signals to the column conductors. The data signal drive circuit can be of a conventional kind used in matrix display devices comprising a sample and hold circuit operated by a shift register to perform serial to parallel conversion of a serial data signal input. A sampled data signal is supplied to a column of display elements via a column address conductor by a respective stage of the sample and hold circuit. It is common in such data signal drive circuits for the sampled data signals to be fed to the column address conductor via respective buffer amplifiers.

The display and sensing elements share the same row and column address conductors with an associated pair of display and sensing element conductors being connected to a respective column address conductor. A row selection signal provided by a scan drive circuit defines a row address period during which display information is written into a row of display elements and a read out is provided from the associated row of sensing elements. A charge is periodically applied to the capacitors of the sensing elements and this charge is changed in the intervening periods if the photosensitive element is illuminated. The charge state of the capacitors is monitored to provide an indication of whether or not the sensing elements have been illuminated by means of a detection circuit which includes for each column of sense elements a respective charge sensitive amplifier circuit connected to a column address conductor providing a read-out in accordance with the charge state of the sensing elements.

The use of charge sensitive amplifier circuits for providing a read-out from an array of light sensitive elements follows known practice in matrix light sensing devices, without a display function, for example as described in EP-A-0237365.

OBJECTS AND SUMMARY OF THE INVENTION

It is an object of the present invention to provide an improved combined matrix display and light sensing device in which the required drive circuitry is simplified.

According to the present invention there is provided a combined matrix display and light sensing device of the kind described in the opening paragraph which is characterised in that the control means is operable to apply to the second input of each charge sensitive amplifier circuit data signals from the second drive circuit when the switch is closed and said read potential when the switch is open.

With this arrangement, therefore, a single amplifier circuit is utilised to perform the role of a charge sensitive amplifier in the detection circuit and also the role of a buffer amplifier in the data signal drive circuit. The invention stems from the recognition that both functions can be performed conveniently with a single amplifier circuit in time sharing manner. With the switch of the sense amplifier circuit in its closed state, a data signal applied to the second input appears on an associated address conductor of the second set, and can then be transferred to a selected display element in the usual manner. With the switch in its open state and with a read potential applied to the second input the charge sensitive amplifier circuit behaves in conventional manner to provide a read-out from a selected sensing element. The peripheral drive circuitry for the arrays of display and sensing elements is thus considerably simplified with the number of components required being significantly reduced. An additional and advantageous consequence of this simplification is that the drive circuitry consumes less power.

In one embodiment of the device, individual address conductors of the second set may be connected to display elements and sensing elements, as in the arrangement described in EP-A-0491436, in which case the individual address conductors are each connected to the first input of a respective charge sensitive amplifier circuit. Such sharing of the address conductors of the second set by the display and sensing elements minimizes the number of address conductors required and simplifies construction. However, it may be preferred in some situations to use separate address conductors for the sensing and display elements respectively, for example to allow the sensing and display elements to be operated more independently. In another embodiment, therefore, the display elements and sensing elements may be connected respectively to different ones of the second set of address conductors in which case a pair of address conductors of the second set comprising one connected to display elements and one connected to sensing elements may be connected to the first input of a respective charge sensitive amplifier circuit via a change-over switch operable by the control means in synchronism with the switch of the sense amplifier circuit.

BRIEF DESCRIPTION OF THE DRAWING

Embodiments of a combined matrix display/light sensing device in accordance with the present invention will now be described, by way of example, with reference to the accompanying drawings, in which.

Figure 1:
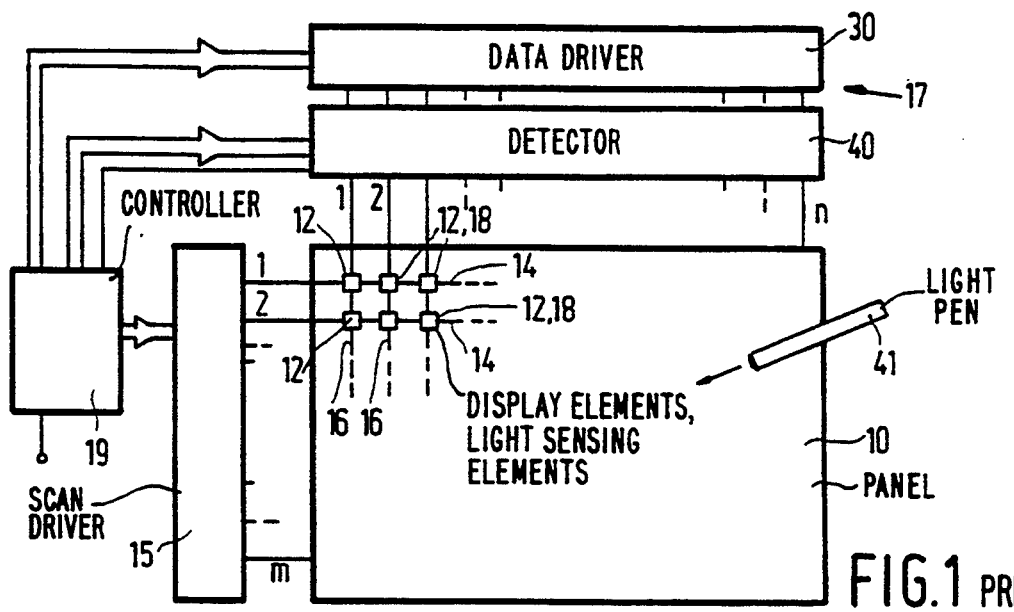
FIG. 1 is a schematic diagram of one embodiment of a combined matrix display and light sensing device according to the present invention.

It should be understood that the Figures are merely schematic and are not drawn to scale. In particular, certain dimensions may have been exaggerated while other dimensions may have been reduced. It should also be understood that the same reference numerals are used throughout the Figures to indicate the same or similar parts.

DESCRIPTION OF THE PREFERRED EMBODIMENTS

Referring to FIG. 1, the device comprises a panel 10 having combined row and column arrays of actively addressed liquid crystal display elements 12 and light sensing elements 18 with sets of row and column address conductors 14 and 16, respectively, and peripheral drive circuitry comprising a scan signal drive circuit 15 connected to the row address conductors 14, a column drive/read circuit 17 connected to the column address conductors and a control circuit 19 which controls the timings of the operations of the circuits 15 and 17 and supplies operating voltages and a video signal providing display data signals for the display elements. With the exception of the column drive/read circuit 17, and to an extent the control circuit 19, the device is similar in many respects to that described in EP-A-0491436 whose disclosure is therefore incorporated herein by reference. In particular, the panel 10 and the manner of its operation generally corresponds to that of EP-A-0491436, and consequently the description of these aspects will be kept brief. For further information, the reader is invited to refer to the aforementioned patent specification.

Figure 2:
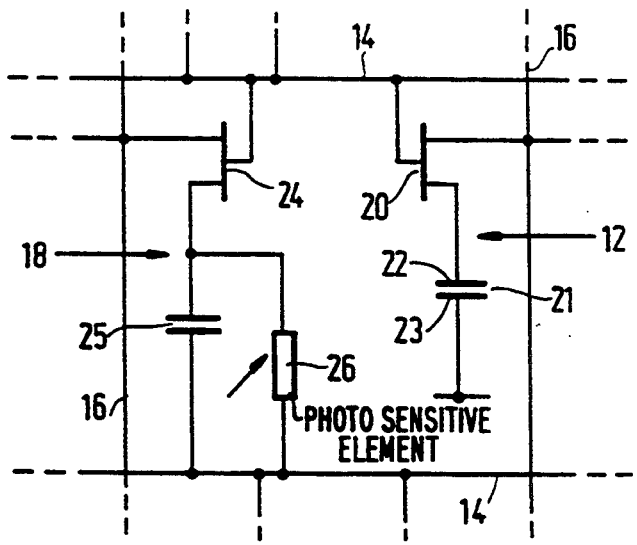
FIG. 2 is a schematic circuit diagram of a typical display element and light sensing element combination of the device.

The panel 10 has m rows of display elements with n horizontally arranged display elements in each row. Each display element 12 is located at a respective intersection between crossing sets of m row address conductors 14 and n column address conductors 16. Only a few of the display elements are shown in FIG. 1, for clarity. A sensing element 18 is located adjacent each display element 12, except for the first column of display elements, giving a high resolution sensing capability. The circuit of one typical pair of display and sensing elements is shown in FIG. 2. Each display element 12 includes a thin film field effect transistor, TFT, 20 connected with a liquid crystal element 21, represented by a capacitor. The gates of all TFTs 20 of the display elements in one row are connected to a respective one of the row address conductors 14. The sources of all TFTs 20 of picture elements in one column are connected to a respective one of the column address conductors 16. The drain terminals of the TFTs 20 are connected to a first electrode 22 of their associated LC elements 21. The sets of row and column address conductors 14 and 16, the TFTs 20, and the LC element first electrodes 22 are all carried on a supporting plate of transparent insulating material, for example glass. The panel 10 further comprises a second transparent supporting plate arranged parallel to, and spaced from, this supporting plate with twisted nematic LC material contained therebetween. This second plate carries a continuous transparent conductive layer constituting an electrode, 23, common to all LC display elements. The two opposing plates are provided internally with orientation layers and externally with polarising layers in the usual manner for LC display devices.

Each sensing element 18 includes a TFT 24. The sensing elements share the same address conductors as the display elements with the gates of all TFTs 24 in a row being connected to a respective one of the row address conductors 14 and with the sources of all TFTs 24 in a column being connected to a respective one of the column address conductors 16. The source of the TFT 24 is connected to one side of charge storage capacitor 25 whose other side is connected to an adjacent row address conductor 14 associated with the next row of display and sensing elements. In an alternative arrangement, the other sides of the capacitors 25 may instead be connected to dedicated auxiliary row conductors as described in EP-A-0491436. In a further alternative arrangement, the source of the TFT 24 may be connected to the same column address conductor 16 as the TFT 20 rather than the adjacent column conductor associated with the preceding column of display elements as shown.

The sensing element 18 includes a photosensitive element 26, constituted by a photoresistor, which is connected across the capacitor 25 between the drain of the TFT 24 and the next row address conductor 14 (or auxiliary row conductor if used). The photosensitive elements can comprise other forms of photo conductive devices which exhibit an increase in conductance in response to being illuminated, for example photodiodes, as also described in EP-A-0491436.

In this particular embodiment, the TFTs 20 and 24 comprise hydrogenated amorphous silicon TFTs, and the photo-resistors 26 comprise amorphous silicon material.

Referring again to FIG. 1, the scan signal drive circuit 15 is of a kind conventionally used in TFT matrix display devices and comprises a digital shift register whose operation is controlled by timing signals provided by the control circuit 19 and which sequentially addresses the row conductors 14 with a selection (scan) signal on a row-at-a-time basis. The drive circuit 15 applies a selection signal to each row address conductor 14 in turn, and holds each conductor 14 at a reference potential level in the interval between successive selection signals, corresponding to a field period.

The column drive/read circuit 17 operates to apply data signals to the array of display elements so as to produce the required display effect on the panel and also to monitor light inputs applied to the array of sensing elements, and to provide an indication in accordance therewith. To this end the circuit 17 comprises a data signal drive circuit 30 similar to those commonly used in TFT display devices and consisting of a sample and hold circuit operated by a shift register to perform serial to parallel conversion of a video signal supplied in serial form from the control circuit 19. Data signals for each row of display elements in turn are provided by the circuit 30 to the column address conductors 16 in synchronism with the selection signals applied to the row address conductors 14. Data signal drive circuits of this kind are well known in the field of matrix liquid crystal display devices and accordingly will not be described here in detail.

The circuit 17 further includes a detection circuit 40 which comprises a set of charge sensitive amplifiers, one for each column conductor, whose function is to provide an output indicative of the state of the sensing elements 18, that is, according to whether or not they have been illuminated, for example by means of a light pen referenced at 41 in FIG. 1. The charge state of a sensing element's capacitor 25, e.g. the level of the charge stored in a capacitor 25, is dependent on whether or not the associated photosensitive element 26 has been illuminated. The detection circuit periodically addresses the capacitors 25 to sense their charge state and provides an output in accordance therewith indicating whether or not the sensing elements have been subjected to illumination in the interval between successive addressing. The light pen 41 consists of a light source which continuously emits light in operation. Movement of the pen over the display panel results in sensing elements located under its path of travel being illuminated. The detection of those illuminated sensing elements, representing the pattern of the light pen movement, enables data or information to be written into the device.

The arrays of display and sensing elements of the panel 10 are operated in a manner similar to that described in EP-A-0491436 to which reference is invited for details. Briefly, each selection signal supplied to a row address conductor defines a row selection period and turns on the TFTs 20 and 24 of the display and sensing elements in the row concerned for the duration of this period. For the remainder of a field period the TFTs are held off by a lower, non-selection reference level applied by the circuit 15 to the row address conductor. During a first part of a selection signal, a suitably selected reference potential level, constituting a "read" potential as will become apparent, is applied to the column conductors 16 and during a latter part of the selection signal the data signals provided by the data signal drive circuit 30 are applied to the column conductor 16 and consequently loaded into the display elements of that row. Similarly, the capacitors 25 of the sensing elements of that row are also charged according to the level of the applied data signals and also the level of the non-selection potential then being applied to the other side of the capacitors 25.

Following termination of the row selection signal the TFTs 24, like the TFTs 20, of that row are turned off, thereby isolating the capacitors 25, until the row of sensing elements is next addressed in the subsequent field period. When next addressed with a row selection signal the TFTs 20 and 24 of the display elements and sensing elements of the row are again turned on and the potential of the column conductors 16 during this first part of the row selection signal is similarly set to the selected reference level. Depending on the level of charge then existing on the capacitors 25 a charging current will flow through the conductors 16 to charge the capacitors 25 (and the display elements 21) to the column conductor voltage. The sensitivity of the photosensitive elements 26 of the elements 18 is chosen so that under normal ambient illumination the capacitors 25 are not discharged to any significant extent and accordingly very little charging current flows during this period in the case where the photosensitive elements have been subjected only to ambient illumination in the preceding field period.

If during the preceding field period a sensing element 18 has been "written" with the light pen 41 then the comparatively high light intensity will have caused the photosensitive element 26 of the sensing element 18 to conduct heavily, thus substantially discharging the capacitor 25 so that an appreciable charge will flow into its capacitor 25.

The charge sensitive amplifiers of the detection circuit 40 connected to respective column conductors 16, are responsive to the charges supplied to the capacitors 25 in this period. After amplification in the sensing amplifiers the signals produced as a result of the recharging of the capacitors 25 are passed to a threshold circuit of the detection circuit 40 whose output switches state if the signal level exceeds a predetermined value which is set to lie between that produced by a "written" and an "unwritten" sensing element. The reference, read, level applied to the column conductors is selected such that the polarity of the charging signals for written and unwritten sensing elements will be opposite, which can make discrimination between them easier. The output obtained from the circuit 40 is passed to the control circuit 19.

The detection circuit 40 will now be described with reference to FIG. 3, which illustrates schematically the circuit of one typical stage of the detection circuit 40 associated with a respective column conductor 16, the circuit 40 having identical stages for other column conductors. The stage consists of a charge sensitive amplifier circuit 45 comprising an operational amplifier 46 with a capacitor 47 and a switch 48 connected in parallel between its inverting input and its output in a conventional manner. The output and inverting input are connected respectively to a multiplexer 50 and the column conductor 16. The non-inverting input of the amplifier is . connected to a change over switch 51. The switches 48 and 51 are operable under the control of switching signals supplied by the control circuit 19. During the first part of a selection signal applied to a row conductor 14, the switch 48 is opened and the switch 51 set to the position illustrated in which reference "read" potential level, here designated Vread, is applied to the amplifier's non-inverting input. Charging current for the capacitor 25 of the selected sensing element associated with the column conductor 16 is then integrated by the sense amplifier circuit 45. The resulting output voltage from this read operation appears at the output of the operational amplifier 46 and is supplied, along with the outputs from the operational amplifiers of the other stages, to the multiplexer 50 from which a serial output of signals representing the charge states of the capacitors of the selected row of sensing elements is obtained in the interval between successive row selection signals. Read-out of the charge sensitive amplifiers may be obtained other than via a multiplexer.

The serial output may be supplied to a discriminator, for example a threshold level detector, whose binary output has first and second levels, representing the two possible states to the sensing elements, e.g. written or unwritten.

The timing of the transition between the aforementioned first and latter parts of the row selection period is determined by the control circuit 19 which supplies switching signals to the switches 48 and 51 so as to close the former and connect the non-inverting input of the amplifier to the output from the respective sample and hold stage of the data signal drive circuit 30 on which a data signal intended for the selected display element is present. Closure of the switch 48 serves to reset the capacitor 47 and connects the amplifier output directly with the column conductor 16. In this configuration the sense amplifier behaves as a unity gain buffer and the data signal present at the non-inverting input appears on the column conductor 16. Consequently, the LC element of the selected display element is charged according to the level of this data signal. Thus, the amplifier circuit 45 fulfills two roles, namely to act as a charge sensitive amplifier in a read operation to determine the state of the sensing element and to act as a buffer amplifier between the sample and hold circuit of the data signal drive circuit 30 and the column conductor 16 during the display element loading operation.

The other stages of the detection circuit 40 operate simultaneously in identical manner to read and load their sensing and display elements respectively in the same row.

Upon termination of the row selection signal to the row conductor the control circuit 19 opens the switch 48 and operates the switch 51 to connect the non-inverting input to the source of Vread. A row selection signal is then applied to the next row conductor 14 and the sequence of operations is repeated so as to read and load the sensing and display elements in this row. This operation is repeated for each row of sensing and display elements so that over the course of a display field period the conditions of all the sensing elements in the array are read and all the display elements are loaded with their respective data signals, the arrays being repeatedly addressed in this manner in successive fields.

As this embodiment is similar to that described in EP-A-0491436 except for particularly the configuration and manner of operation of the column drive/read circuit, it shares similar advantages. In particular, the sensing elements have a memory function so that an indication of a light input can be obtained after the event and the sensing and display elements share the same row and column address conductors which greatly simplifies construction. These and other advantages are discussed in EP-A-0491436.

Various modifications are possible as described in EP-A-0491436, for example with regard to the components of the sensing elements and their circuit configuration.

The invention is not restricted to this particular kind of device, however, but can be applied to other kinds of combined matrix display and light sensing devices in which the light sensing elements are read using sense amplifiers and in which buffer amplifiers are required between a circuit supplying data signals for the display elements and the column address conductors.

Other kinds of combined matrix display and light sensing devices are known which rely on sensing of a light input simultaneously with the application of that input. In these devices a basic frame period is divided into a display frame interval during which all rows of display elements are addressed with display information followed by a light detection interval during which the conditions of the sensing elements are detected. Such temporally separate display and detection frames are avoided in the above-described embodiment. In other known devices separate sets of row and column address conductors are used for the display and sensing elements respectively, thus doubling the number of address conductors required assuming display and sensing elements are provided on a one to one basis.

Figure 3:
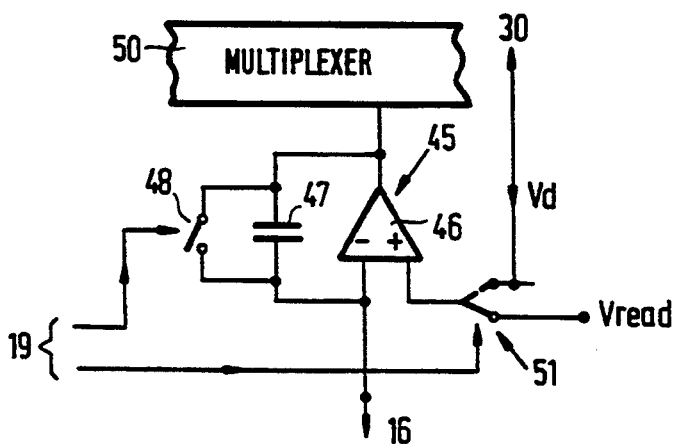
FIG. 3 shows schematically a single stage of a sense circuit of the device of FIG. 1.
Figure 4:
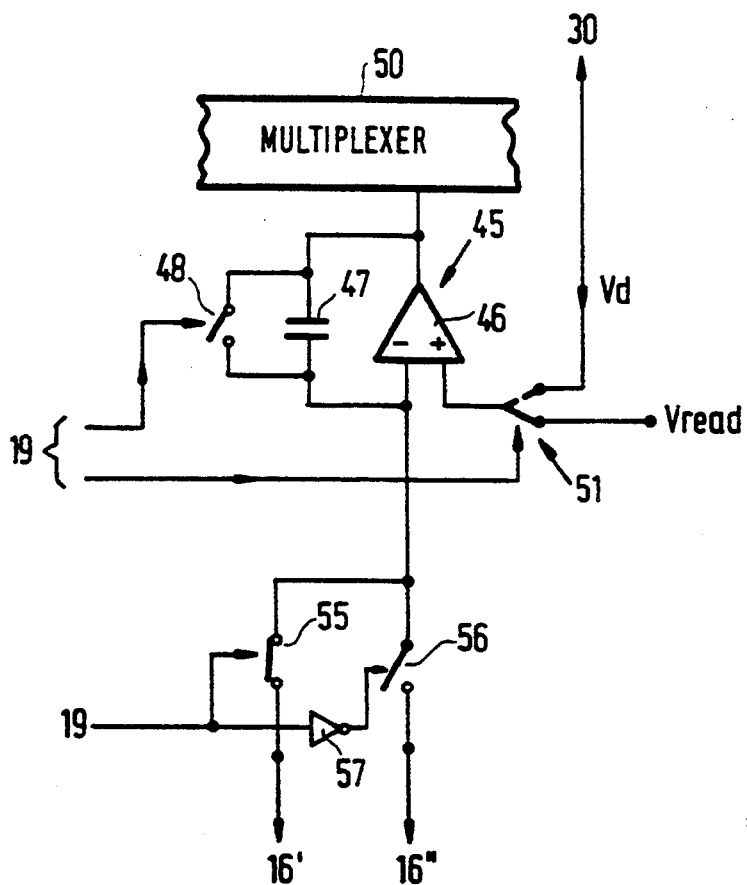
FIG. 4 shows schematically a single stage of a modified sense circuit in a second embodiment of a combined matrix display and light sensing device according to the present invention.

FIG. 4 illustrates a modification of the circuit configuration depicted in FIG. 3 another embodiment in which the device comprises separate column address conductors for each column of sensing and display elements. The column conductors for the sensing elements and the display elements are designated 16' and 16" respectively. This circuit further includes switches 55 and 56 connected between the amplifier input and the sensing element column conductor 16' and the display element column conductor 16" respectively. A switching signal from the control circuit 19 is applied to the switch 55 and, through an inverter 57, to the switch 56 in synchronism with operation of the switches 48 and 51 so that: when the switch 48 is open, the switches 55 and 56 are closed and open, respectively, and the read potential Vread appears on the conductor 16'; and when the switch 48 is closed, the switches 55 and 56 are open and closed, respectively, such that the data signal Vd appears on the conductor 16".

Figure 5:
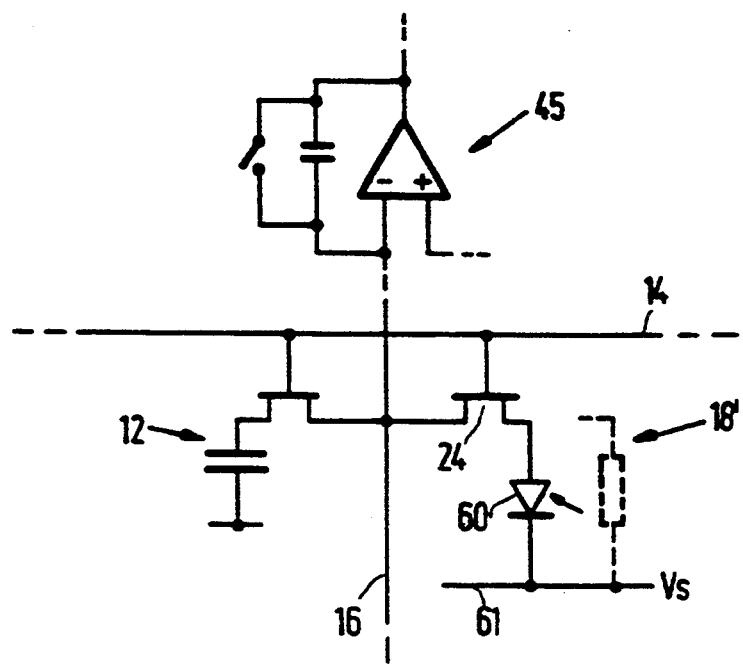
FIG. 5 shows schematically the circuit of an alternative form of light sensing element.

FIG. 5 illustrates schematically the circuit for an alternative form of sensing element, 18', and its connection to an associated sense amplifier circuit 45. The drain of the sensing element TFT 24 is connected to one side of a photodiode 60 whose other terminal is connected to a supplementary row conductor 61 common to all sensing elements in the same row, which is held at a predetermined reference potential Vs. Upon the application of a row selection signal to the row address conductor 14, and with the switch 48 of the charge sensitive amplifier circuit 45 open, charge is integrated on the capacitor 47 when the photodiode is illuminated with a light input. The photodiode 60 may be replaced by a photoresistor as depicted in dotted outline in FIG. 5.

From reading the present disclosure, other modifications will be apparent to persons skilled in the art. Such modifications may involve other features which are already known in the field of matrix display and light sensing devices and which may be used instead of or in addition to features already described herein.

I claim:

1. A combined matrix display and light sensing device comprising:
   (a) an array of display elements,
   (b) an array of light sensing elements which are responsive to illumination so as to provide an electrical charge indicative thereof,
   (c) first and second sets of address conductors connected with the arrays of display elements and light sensing elements, the display elements and the light sensing elements each being connected with an address conductor of each set,
(d) a first drive circuit connected to the first set of address conductors for scanning the arrays,
(e) a second drive circuit for providing data signals which are supplied to the display elements via address conductors of the second set,
(f) a detection circuit for sensing the charge provided by the sensing elements, and comprising charge sensitive amplifier circuits, each having
  (1) an output,
  (2) a first input connected to an address conductor of the second set,
  (3) a second input for receiving a read potential, and
  (4) a capacitor and switch connected in parallel between the output and the first input, and
(g) control means for opening and closing the switch of each charge sensitive amplifier circuit periodically and providing the read potential to the second input, characterised in that the control means is operable to apply to the second input of each charge sensitive amplifier circuit data signals from the second drive circuit when the switch is closed and said read potential when the switch is open.

2. A device according to claim 1, characterised in that individual address conductors of the second set are connected to display elements and sensing elements and in that the individual address conductors are each connected to the first input of a respective charge sensitive amplifier circuit.

3. A device according to claim 1, characterised in that the sensing elements and the display elements are connected respectively to different address conductors of the second set and in that the first input of each charge sensitive amplifier circuit is connected to a respective pair of address conductors of the second set comprising one connected to sensing elements and one connected to display elements via a change-over switch which is operable by the control means in synchronism with the switch of the charge sensitive amplifier circuit.

* * * * *